Dec. 31, 1929.   R. L. R. WILD   1,741,896
FRICTION RESISTIVE MATERIAL FOR BRAKES, CLUTCHES, OR THE LIKE
Filed Dec. 20, 1928
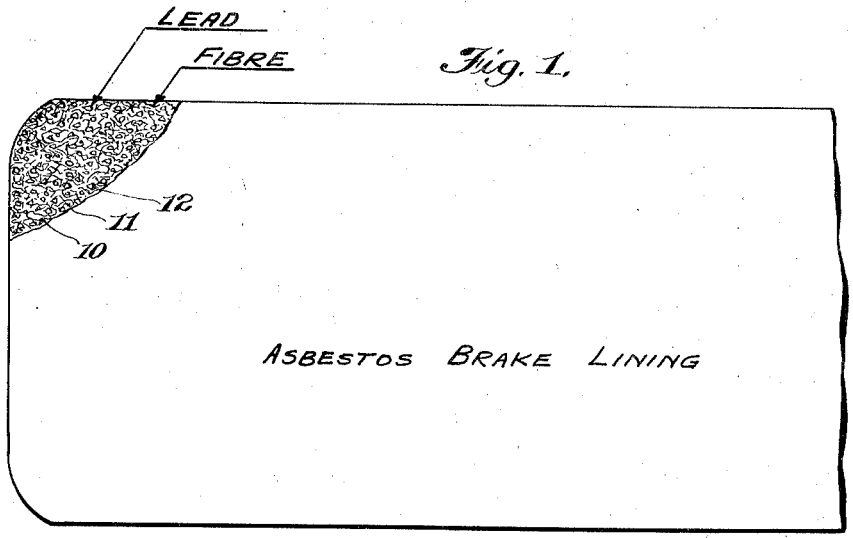
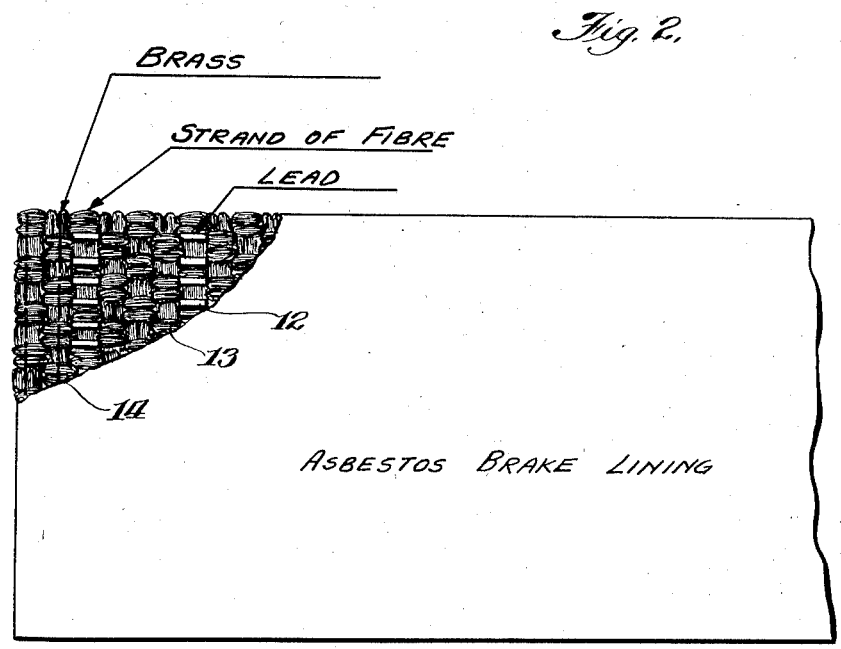
Inventor
Rudolf L. R. Wild,
By Williams, Bradbury, McCaleb & Hinkle
Attys.

Patented Dec. 31, 1929

1,741,896

UNITED STATES PATENT OFFICE

RUDOLF L. R. WILD, OF CHICAGO, ILLINOIS, ASSIGNOR TO UNION ASBESTOS & RUBBER CO., OF CHICAGO, ILLINOIS, A CORPORATION OF ILLINOIS

FRICTION-RESISTIVE MATERIAL FOR BRAKES, CLUTCHES, OR THE LIKE

Application filed December 20, 1928. Serial No. 327,199.

This invention relates to friction resistive material and pertains more particularly to a material of the type which consists essentially of asbestos fibers reinforced or held together by a suitable binder.

The frictional resistive material used in brakes, clutches and the like, is often subjected to severe conditions of temperature. The heat generated sometimes makes the drum red hot, and the instantaneous temperature at the point of frictional engagement is naturally very high. This high temperature often causes the formation of silica, carbides, slags, or other products which are extremely hard and which have sharp cutting edges that cut or score the brake drum. This is particularly true if pressed steel drums are used, as I have found that they are scored by bands of this type much more easily than cast iron drums.

The embodiment which has been chosen to illustrate the invention consists of a brake band, but it should be understood that the present invention is not limited to use for brake bands, but may be used for clutch facings, and for any other commercial purposes which require one or more of the advantageous characteristics described hereinafter. The invention is not limited to the drum type of brake or clutch, and I desire it to be understood that wherever I employ the term "band" throughout the following specification and claims, it is used in the generic sense, meaning a piece of heat resistive and friction resistive material used for frictional engagement with another mechanical part.

The object of my invention is to provide a brake band that will withstand the most severe conditions of wear and temperature without scoring the brake drums, even though they be of pressed steel.

A further object of my invention is to minimize the "squealing" noise which is often produced by the engagement of the brake bands with the drums.

A further object is to minimize the tendency of the brake to "grab" and deaden or prevent objectionable vibrations of all kinds.

A further object is to provide a brake with more uniform operating characteristics. Other objects will be apparent from the detailed description of preferred embodiments hereinafter set forth.

I have discovered that by incorporating metallic lead into a brake band of the type above referred to new and unexpected results are obtained which are of great commercial value. Heretofore lead has been used in shoes for braking car wheels, etc., but the function of the lead in these instances is entirely different from that of the present invention. In the former instances lead was used to prevent pressed paper shoes from slipping when they became wet and was used in cast iron shoes to act as a dry lubricant. These functions of the lead are incidental in my invention, and its primary function is chemically to prevent the formation of silica, slags, carbides and other hard substances which may otherwise be formed at the wearing surface and which cause the scoring of pressed steel brake drums.

One accepted explanation of the presence of these abrasive particles and the scoring action of the friction materials of the prior art, is the chemical combination of certain materials known to be present in the friction lining or upon its surface, and capable, under the influence of high temperature and pressure, of combining chemically to form the abrasive slags, silicates, and/or carbides, which are found at the surface of the scoring linings, and while this theory is set forth in so far as it has been developed at this time, I do not wish to limit myself to any specific theory or hypothesis for explaining this phenomenon.

For example, the ordinary brake linings of the prior art generally include asbestos fibers or chrysotile, and an exemplary analysis of the chemical composition of chrysotile is as follows:

*Asbestos (chrysotile-canadian) analysis*

|  | Per cent |
| --- | --- |
| $SiO_2$ (silica) | 40.49 |
| $Al_2O_3$ (alumina) | 1.27 |
| $Fe_2O_3$ (iron) | 2.53 |
| $MgO$ (magnesia) | 41.41 |
| $H_2O$ (combined water) | 14.06 |
| Miscellaneous | 0.24 |
| Total | 100.00 |

There is also present in the woven friction lining a certain amount of cotton twisted in with the asbestos fibers to give the asbestos fibers better spinning qualities, and there may be particles of abraded steel from the drum, and dezinced brass wire; that is, brass wire from which the zinc has been removed by heat or pressure incident to the braking action, consequently, leaving the wire largely copper. There may also be present, particles of carbon in the form of abraded steel, carbonized cotton, or carbonized tung oil.

From the foregoing, it will be evident that the dehydration of the asbestos under heat and pressure, may cause any of the three elements, namely, silicate, alumina or iron, to combine with an alkali, such as magnesia, forming a magnesium silicate, as for instance, $3MgO.2SiO_2.2H_2O$, but as a matter of fact, it is impracticable to state definitely the chemical reactions which take place in every case.

It is also known that silica, carbon, and particles of steel may be fluxed by the application of heat and pressure to form a flux and some slag, which may also consist of abrasive particles of the type found upon the friction linings used with scored drums in the devices of the prior art.

Such abrasive particles, consisting of silicates, carbides, or slags, which would otherwise be formed out of the materials present in ordinary asbestos, by the dehydration of the asbestos under high temperature and pressure, are not formed by the friction materials constructed according to the present invention, and the lead wires or members, interwoven or distributed among the strands of asbestos, act as an inhibitive agent for preventing the formation of such chemical compounds.

I will now describe preferred embodiments of my invention which are illustrated in the accompanying drawings which form a part of this specification and in which Fig. 1 is a perspective of a pressed fiber brake band; and Fig. 2 is a perspective of a woven brake band.

The brake band illustrated in Fig. 1 is composed of short asbestos fibers 10 felted together and impregnated by a suitable binder 11, the band having metallic lead 12 incorporated in it.

Felted bands may be prepared by a process which is similar to the process for making paper. Rolls carry an endless blanket through a vat containing a pulp or thin cream of asbestos fibers and water. This vat may also contain other cellulose fibers and chemicals adapted to act as a filler to give the desired properties to the finished brake band. The band is built up by plies of felted fibers which are deposited on the blanket by sucking water through it in a manner well known in the art.

Lead may be incorporated into the brake band by thoroughly mixing lead powder or granules in the pulp, but since lead is extremely heavy and could not be readily suspended in the pulp, I prefer to springle it between the plies of the band as powder, granules, small strips or wires. When the band has been built up to the desired thickness it is thoroughly dried and impregnated with China wood oil (tung oil), bitumens, gums, resins and solvents therefor in any conventional manner, after which the band is pressed and subjected to a heat treatment.

The metallic lead in the finished band not only acts as a dry lubricant and insures intimate contact with all parts of the drum, but it prevents the formation of silica or slags which might otherwise cause the scoring of pressed steel brake drums.

The embodiment shown in Fig. 2 represents a woven brake band in which relatively long fibers of asbestos, usually mixed with a small percentage of cotton for increasing its tensile strength are woven, impregnated with the binders above enumerated, and subjected to the necessary pressure and heat treatment. Under severe operating conditions the temperature may be great enough to cause the decomposition of the cotton, the carbon of which may form carbides with reenforcing metals or other elements present in the brake band. Likewise the brass reenforcing wire may be "dezincified". The asbestos may yield hard silica crystals or may cause the formation of an abrasive slag.

Lead may be introduced into these bands during the weaving process by coating the asbestos strands 13 with lead powder, weaving fine lead wires with the strands, or dispersing lead powder or lead granules between the woven strands. The function of the lead wires as shown in Fig. 2 is entirely separate and distinct from the function of the brass wires 14, the latter being to add mechanical strength to the band so that it will withstand tensile and torsional strains and will not pull away from its retaining rivets.

While I have illustrated preferred embodiments of my invention, it is understood that these are descriptive only and that I am not limited to the details therein set forth, except as defined by the appended claims. I contemplate that lead may be introduced into the band in any suitable manner and in any suitable form, and I contemplate that any alloys of lead, such as antimony lead, etc., may be used.

The term "lead" as used in the accompanying claims is hereby defined to include not only the pure element but any alloy thereof in which the properties of this element are retained.

It is essential that the brake band contain asbestos fibers which might cause the formation of silica or slags, and the invention is particularly applicable when the brake band is to be used with a pressed steel brake drum.

I claim:

1. In combination, a brake drum of pressed steel, an asbestos brake band associated with said drum, said asbestos band having metallic lead wires incorporated therein whereby scoring of the brake drum is prevented.

2. The process of making brake bands or the like comprising interlocking asbestos fibers, associating metallic lead strips with said interlocked fibers, impregnating said fibers with a resinous binder, and subjecting the impregnated mass to a heat treatment.

3. A frictional resistive band comprising woven asbestos, reenforcing wires and lead wires woven therein, and a resinous binder incorporated therein by impregnation and heat treatment.

4. A frictional resistive band comprising asbestos fibers, a small proportion of cotton fibers for reenforcing the same, a resinous binder incorporated therein by impregnation and heat treatment, and metallic lead members associated therewith whereby the formation of abrasive substances is prevented even under severe operating conditions.

5. A friction material comprising a woven fabric having metallic lead wire interwoven among the strands of asbestos and exposed for engagement with a cooperating metallic friction surface at a plurality of points.

6. A friction material comprising a woven fabric having metallic wire interwoven among the strands of asbestos and exposed for engagement with a cooperating metallic friction surface at a plurality of points, said wire comprising metallic lead adapted to act as an inhibitive agent to prevent the formation of abrasive materials at the friction surface.

7. A friction material comprising a base of asbestos fibers having strips of metallic lead distributed among the fibers of asbestos and having both lead and asbestos exposed for engagement with a cooperating metallic friction surface.

8. In a friction lining, the combination of an asbestos base with lead wires carried thereby and interwoven between the asbestos fibers, said lead being adapted to prevent the formation of abrasive compounds from the materials present under the normal temperature and pressure conditions.

9. In a friction lining, the combination of an asbestos base with metallic lead members carried thereby and interspersed between the asbestos fibers, said lead being adapted to prevent the formation of abrasive compounds from the materials present under the normal temperature and pressure conditions, and said lining being impregnated with water shedding oil.

In witness whereof, I hereunto subscribe my name this 17th day of December, 1928.

RUDOLF L. R. WILD.